March 29, 1955   G. S. EDGINGTON   2,705,001
VALVE MECHANISM FOR INTERNAL COMBUSTION ENGINES
Filed July 16, 1953
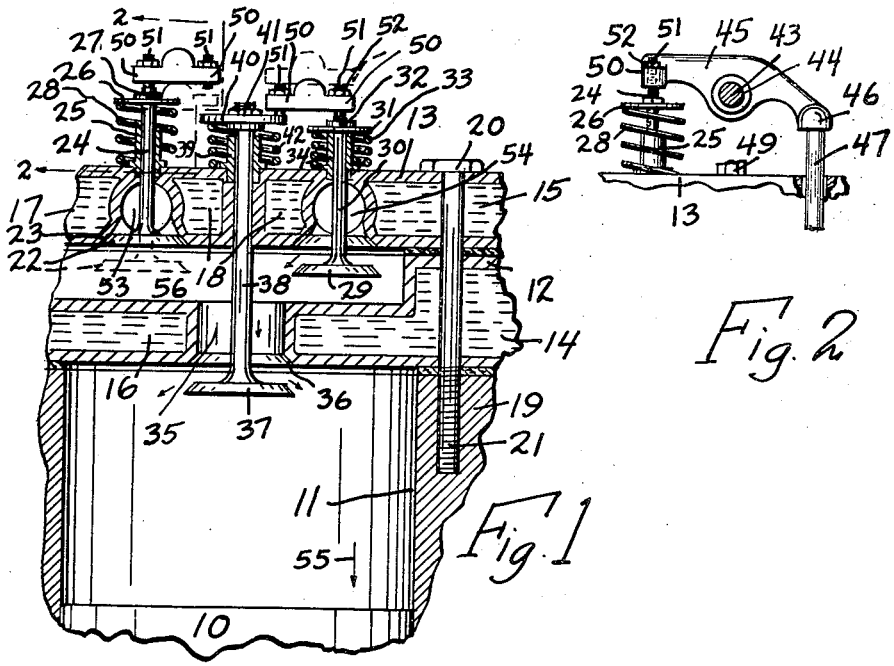
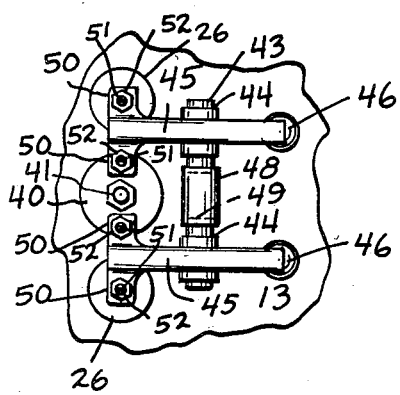
INVENTOR.
Glenn S. Edgington
BY
ATTORNEY

United States Patent Office 2,705,001
Patented Mar. 29, 1955

2,705,001

VALVE MECHANISM FOR INTERNAL COMBUSTION ENGINES

Glenn S. Edgington, Sioux Falls, S. Dak.

Application July 16, 1953, Serial No. 368,395

1 Claim. (Cl. 123—79)

My invention relates to a valve construction, or mechanism, for use with internal combustion engines.

An object of my invention is to provide a certain valve structure which will allow the use of extremely high pressures in the cylinders of internal combustion engines.

A further object of my invention is to provide a structure which will provide this result, and yet which structure is comparatively simple in operation, and requires relatively few parts.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a sectional view showing certain details of my valve mechanism as associated with the piston and cylinder of an internal combustion engine, Figure 2 is a sectional view of Figure 1 taken substantially along the lines 2—2 thereof, and Figure 3 is a plan view of the valve structure.

My invention contemplates the provision of a valve structure in internal combustion engines wherein very high pressures can be utilized within the cylinders of the engine, and wherein certain difficulties heretofore encountered in using said high pressures can be eliminated, such difficulties usually residing in the fact that the exhaust valves and valve faces of such internal combustion engines will become so extremely heated that the surfaces of the valves and faces will deteriorate rapidly to such an extent that it would be impractical to use the high pressures.

My invention therefore contemplates a provision for eliminating this difficulty by the use of a separate valve, which is so arranged that it is cooled during the intake stroke of the cylinder, and thereby providing the above mentioned advantages.

I have used the character 10 to designate a piston reciprocatingly engaged within the vertical cylinder wall 11, the character 12 indicating an intermediate head, and the character 13 an upper removable head, these heads having the various water spaces 14, 15, 16, 17 and 18, the heads being secured to the main block portion 19 by means of the lengthened bolts 20 having the threadably engaged ends 21.

I have further used the character 22 to designate the exhaust valve, being suitably tapered to engage the valve face 23, with the character 24 indicating the stem of the valve, the stem being reciprocatingly mounted within the insert 25 which is suitably secured as shown to the upper block, and attached at the upper end of the stem 24 is the washer 26 which is suitably retained at 27, and I provide a helical spring 28 between the washer and the upper head.

I have further used the character 29 to indicate the intake valve having a stem 30 to which in turn is attached the washer 31 and 32, and with a further compression spring 33 being provided, the stem passing within the insert 34.

Within the portion 12 I provide a circular opening 35 having the valve face 36 against which is adapted to be engaged the extra medial valve 37 having a stem 38, the stem 38 passing within the insert 39 and including the upper substantially enlarged washer 40 suitably secured at 41 to the stem, and with a further compression spring 42 being provided between the member 40 and the top of the head 13.

Rockably mounted on the transverse pin 43 at 44 are a pair of arms 45 terminating in the bosses 46 in which are received the tappet rods 47, these tappet rods 47 passing downwardly wherein they are operated by any suitable cam mechanism driven by the engine, the pin 43 being suitably secured within a transverse member 48 which is supported by means of a vertical bracket 49 which extends upwardly from the upper head portion 13.

The arms 45 extend into the laterally positioned portions 50 which include the adjustable set screws 51 which are adjustably secured by means of the nuts 52, the set screws 51 being threadably engaged with the portions 50 to effect the necessary adjustment between the members 50 and the tops of the valve stems 24 and 30. The inner set screws 51 will effect the adjustment with respect to the member 40, so that therefore all four set screws can be used to provide the required adjustment.

The character 53 indicates the exhaust port and the character 54 the intake port, and it should be specifically understood of course that the description hereinabove pertains to one cylinder only of the engine, the same structure being provided in all cylinders.

The operation of the structure is as follows. As shown in Figure 1, the member 10 is descending in the direction of the arrow 55. During this action, the rocker arm 45 will be depressed, or the rod 47 will rise, and during the depression of the forward portions 50, it will be noted that the intake valve 29 will open, and at the same time the auxiliary valve 37 will open as shown. This auxiliary valve, which has just become heated due to the previous explosion stroke, will thus be cooled by the incoming gases from the intake.

Next, the cylinder will rise on the compression stroke and the explosion will take place, and just before this, the valves 37 and 29 will close, with the members 50 etc. rising to the dotted position as shown in Figure 1.

Just after the explosion occurs, the valve structure to the left in Figure 1 will descend, and whereby the portions 50 will descend, thereby opening the exhaust valve 22 as shown by the dotted lines, it being noted also that the valve 37 will also open at the same time, whereby the burned and heated gases will be exhausted in the usual manner.

By virtue of this construction, the exhaust valve itself can never become over-heated and the extra valve 37 will be cooled each time by the incoming stroke, the valves 22 and 29 rising and falling within the extra chamber indicated by the character 56.

It will be specifically noted that the device works in an efficient manner, and that a great many cumbersome parts are eliminated by providing the arrangement wherein the valve 37 is depressed at the same time that each intake or exhaut valve is depressed, by the use of the simple arrangement described and without requiring separate push rods or other mechanisms. It will also be noted that various other advantages are provided other than those set forth in the objects of my invention.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A valve mechanism for internal combustion engines comprising in combination with an internal combustion engine cylinder and a piston therein, an intake valve, an exhaust valve, a third valve, a valve structure including means whereby said third valve is opened incidental upon opening of either said intake, or exhaust valve, said valve structure including rocker arms having expanded portions whereby said expanded portions will engage said intake valve and said third valve simultaneously, or said exhaust valve and said third valve simultaneously, each of said rocker arms including single push rods for operating the same, said third valve including an upper washer attached thereto for engagement with portions of said expanded portions, said third valve having a valve opening, a chamber communicating therewith and to said intake and exhaust valves, means for providing adjustment between said rocker arm expanded portions and all of said valves.

References Cited in the file of this patent

UNITED STATES PATENTS

| | | |
|---|---|---|
| 842,182 | Dieter | Jan. 29, 1907 |
| 1,171,211 | Keiper | Feb. 8, 1916 |
| 1,304,735 | Blumberg | May 27, 1919 |
| 2,103,024 | Smith | Dec. 21, 1937 |